United States Patent [19]
Eisele

[11] Patent Number: 6,147,325
[45] Date of Patent: Nov. 14, 2000

[54] FIXING DEVICE

[75] Inventor: Ernst Eisele, Walheim, Germany

[73] Assignee: Cooper Tools GmbH, Besigheim, Germany

[21] Appl. No.: 09/284,549

[22] PCT Filed: Aug. 20, 1998

[86] PCT No.: PCT/EP98/05312

§ 371 Date: Jun. 8, 1999

§ 102(e) Date: Jun. 8, 1999

[87] PCT Pub. No.: WO99/08824

PCT Pub. Date: Feb. 25, 1999

[30] Foreign Application Priority Data

Aug. 20, 1997 [DE] Germany ................. 297 14 929 U

[51] Int. Cl.[7] .................................................. H05B 1/00
[52] U.S. Cl. ......................... 219/229; 219/230; 219/238; 228/55
[58] Field of Search ............................ 219/229, 230, 219/231, 236, 238, 526, 536; 228/51, 55

[56] References Cited

U.S. PATENT DOCUMENTS

| | | | |
|---|---|---|---|
| 2,062,940 | 12/1936 | Samuels | 219/229 |
| 2,505,625 | 4/1950 | Nordstrom | 219/229 |
| 3,524,045 | 8/1970 | Siegel | 219/229 |
| 3,770,183 | 11/1973 | Vanyi | 228/51 |
| 3,919,524 | 11/1975 | Fortune | 219/238 |
| 3,963,897 | 6/1976 | Wakita et al. | 219/230 |
| 3,984,655 | 10/1976 | Wahl | 219/238 |
| 4,178,496 | 12/1979 | Fortune | 219/230 |
| 4,602,144 | 7/1986 | Vogel | 219/230 |
| 5,804,795 | 9/1998 | Fortune | 219/229 |
| 5,837,973 | 11/1998 | Tamura | 228/51 |
| 5,945,015 | 8/1999 | Feinler | 219/229 |

FOREIGN PATENT DOCUMENTS 646139 11/1950 United Kingdom .

*Primary Examiner*—Teresa Walberg
*Assistant Examiner*—Fadi H. Dahbour
*Attorney, Agent, or Firm*—Coats & Bennett, P.L.L.C.

[57] ABSTRACT

In a fixing device for fixing a soldering tip to a soldering device, the soldering tip comprises a front working end and a rear fixing end opposite the front working end, and the soldering device comprises a joining end for fixing the fixing end. A rotational-symmetric section is arranged at least at one end. In order to enable in a constructive and simple manner a safe and easily detachable fixing of a soldering tip in the soldering device, one end comprises a conical section, which is provided with an outer cone at least at some portions in the circumferential direction. This outer cone is arranged eccentrically with respect to the rotational-symmetric section, wherein the other end is provided with an inner cone in which the outer cone is supported rotatable between an insertion position and a fixing position.

24 Claims, 2 Drawing Sheets

FIXING DEVICE

The present invention relates to a fixing device for fixing a soldering tip at a soldering device, the soldering tip having a front working end and a rear attachment end opposite said front working end, and the soldering device having a joining end for fixing the fixing end, with a rotationally symmetrical section being arranged at least at one end.

A fixing device of that kind is known for instance from EP 132569. In this device the rear fixing end is inserted in a frictionally engaged manner into a receptacle of the joining end, for which purpose the soldering tip with its fixing end must be pressed into an appropriately selected receiving bore thus causing the fixing of the soldering tip.

DE 2657569 discloses a fixing device in which the rear fixing end is provided with an external thread. This thread is screwed into a receptacle having a corresponding internal thread thus causing the soldering tip to be attached at the soldering device.

Furthermore, DE 29600771 discloses a sleeve-shaped tip support which receives a fixing end of a soldering tip. When screwing the tip support to the soldering device, the soldering tip is also fixed, since the tip support presses the soldering tip with a conically tapering opening edge to for instance a heating means.

Starting out from EP 132569, the object of the invention is to enable an easily detachable fixing of a soldering tip in a soldering device in a constructively simple and safe manner.

This object is achieved in that one end comprises a conical portion which is provided at least at certain portions with an outer cone arranged in the circumferential direction, said cone being arranged eccentrically to the rotational symmetric section, wherein the other end is provided with an inner cone in which the outer cone is rotatably supported between an insertion position and a fixing position.

In the subject matter of the application, a thread for the simple and releasable fixing of the soldering tip is not required. Furthermore, there is no need to press the soldering tip into the receptacle for the frictionally engaged attachment. By the cooperation of the outer cone and the inner cone, a rotation of less than 180° is usually required to turn the soldering tip relative to the receptacle from its insertion position to the fixing position. At the same time the rotational-symmetrical section is received at one end by the respective other end, so that a favorable heat transfer from the heating means of the soldering device results. The inner and outer cone can be manufactured in a simple and inexpensive manner. Compared to a pressed-in soldering tip according to the prior art, the release of the soldering tip is simplified by a respective turning out of the fixing position into the insertion position.

According to a preferred embodiment, the rotational-symmetrical section is substantially formed cylindrically.

In the above-mentioned embodiment, the soldering tip may for instance have a tubular shape at its rear fixing end to accommodate the joining end of the soldering device, wherein the outer cone is formed at the joining end and the inner cone is formed at the fixing end. For easier handling and manufacturing the soldering tip, the fixing end may comprise the cylindrical section and the outer cone, wherein the outer cone conically tapers towards the working end, and the joining end may be formed as a receptacle for inserting the insertion end, and it may be formed with an inner cone which tapers conically towards the soldering tip.

In order to further improve the support of the soldering tip in the receptacle, this receptacle comprises a substantially cylindrical receiving section, which may be formed complementary to the cylindrical section of the insertion end of the soldering tip. The outer cone and the inner cone may be formed relatively to these cylindrical sections at a respective position, such as a rear end of the cylindrical section with respect to the soldering tip. In such an arrangement the outer cone would have a maximum diameter which is smaller than an inner diameter of the cylindrical receptacle section. After pushing the outer cone through the cylindrical receiving section, this receiving section would be inserted into the inner cone and would be fixed there by turning into the fixing position.

In another embodiment, the outer cone and the inner cone may be arranged in front of the respective cylindrical section of insertion end and receptacle seen in the direction towards the working end or the soldering tip. In this case, the inner cone would have a minimum diameter which is greater than or equal to the outer diameter of the cylindrical section of the insertion end. The cylindrical section would be inserted through the inner cone up to the cylindrical receiving section of the receptacle.

The rotational-symmetric, or substantially cylindrical section and the receiving section complementary thereto, may also be formed conically. The section extends in a conically tapering manner in the direction towards the receiving section and the latter is conically expanded in the direction of the section at the fixing end of the soldering tip. By this conical design the tightness as well as the heat transfer may be improved. Furthermore the soldering tip may be more easily removed from the receptacle, since the conical section can be removed more easily, also when dirty, than purely cylindrical sections.

The outer cone may also be formed at certain portions along the circumference of the conical section only, wherein this section may otherwise be formed in accordance with the cylindrical section. In order to enable an improved heat transfer in particular in the range of the outer cone, this outer cone may be formed in the circumferential direction continuously as a rotating conical band. Such a conical band can usually be manufactured in a simpler manner as an only section-wise formed outer cone.

To further simplify manufacture and handling when fixing the soldering tip and to improve the heat transfer, the inner cone and the outer cone may be inclined equally along their circumference in the direction towards the working end of the soldering tip. Thereby, a good mutual rotatability and an improved engagement of the outer cone and the inner cone are attained.

In a simple embodiment the inner cone and the outer cone may be formed essentially truncated. Therein, a circumferential surface of the truncated cone forms the circumferential surfaces of the outer and inner cones which taper conically towards the working end of the soldering tip. Furthermore, the outer and inner cone are confined by corresponding end circular faces of the truncated cone having a smaller and a greater diameter. It is self-evident that the smaller end circular face of the inner cone comprises or forms a receiving opening for inserting the greater end circular face of the outer cone, and the substantially cylindrical receiving section opens into the greater end circular face of the inner cone.

In order to further improve the cooperation of outer and inner cone when fixing the soldering tip, the height and depth of outer cone and inner cone may be substantially equal.

In order to further improve the manufacture of the outer cone, a rear side of the outer cone may radially project from the cylindrical section towards the outside. The manufacture of an outer cone requires more effort, in that the rear side thereof extends in the radial direction inclined towards the outer side of the cylindrical section.

In order to be able to manufacture the inner cone in a simple manner and by using as few material as possible, the inner cone may be provided with an annular flange, which is arranged in front of the substantially cylindrical receiving section of the receptacle in the direction of the soldering tip. In this manner the cylindrical receiving section and the inner cone may be formed with different outer diameters in the regions of the receptacle.

In order to support the soldering tip in a simple and safe manner during its rotation from the insertion position into the fixing position, the cylindrical section and the receiving section may have substantially equal diameters. In this manner the cylindrical receiving section is basically used as an abutment, in which the cylindrical section of the insertion end of the soldering tip rotates while the outer cone in the inner cone is rotated from its insertion position into the fixing position.

It would also be possible that the diameters of receiving section and section of the insertion end are only at some portions substantially equal and this portion of the two sections serves as an abutment or pivot bearing.

Similar to the rear side of the outer cone, an inner cone bottom may extend radially inwards towards the cylindrical receiving section. Thereby the manufacture of the inner cone is simplified. It is self-evident that the inner cone may extend analogously to the rear side of the outer cone also in the radial direction inclined towards the cylindrical receiving section. In this context, it must be taken into consideration that in case the rear side and inner cone bottom are inclined they may for instance have a greater mutual contact face in the fixing position of the soldering tip than in case of an radial inward extension.

In order to enable a favorable heat transfer from a heating means of the soldering device to the soldering tip by means of heat conduction, the outer cone and inner cone in the fixing position of the soldering tip may be in abutment partially and in particular in the area of the rear side of the outer cone and the inner cone bottom.

The fixing device according to the invention can in particular also be used for soldering tips of unsoldering devices, wherein in this case the soldering tip is provided with a soldering suction duct. This duct penetrates the soldering tip in the longitudinal direction and is connected to a duct in the receptacle. By the fixing device according to the invention, a vacuum pressure-tight connection between the soldering tip and the receptacle is enabled, wherein a sufficient force is generated between the outer cone and the inner cone and their relative rotatability, said force for instance pressing the rear side of the outer cone to the inner cone bottom. By this force and the tight abutment of rear side and outer cone and inner cone bottom, the heat conduction between the soldering tip and the receptacle or a respective heating means is improved.

For easier handling the soldering tip, and in particular for the attachment thereof, this soldering tip may have a head section with an outer hexagon between its working end and the insertion head. The outer cone preferably extends up to a radially outwardly extending abutment face of the head section so that the outer cone directly follows the head section. In the fixing position of the soldering tip the abutment face may for instance contact a circumferential outer edge of the annular flange and may be pressed thereto further sealing the soldering suction duct and/or for improving the heat transfer.

In order to obtain a sufficient abutment for an even improved sealing between the soldering tip and receptacle, it is a further advantage in this respect if the abutment face projects radially outward to a greater extent than the rear side of the outer cone. Thereby an enlarged abutment face between the abutment face of the head section and the circumferential outer edge of the annular flange is obtained.

The receptacle may directly be a part of the soldering device, wherein it may for instance be arranged in a tip support. Furthermore, the receptacle with its cylindrical receiving section and the inner cone or the annular flange may be formed as an inner bore in a receptacle sleeve. This receptacle sleeve may in a usual manner be fixed at the soldering device, for instance by means of screwing by means of a tip support or the like.

The receiving sleeve may also be designed rotatable with respect to the soldering device, wherein the receptacle or the joining end of the soldering device are arranged basically within the receiving sleeve. By turning the receiving sleeve, the conical eccentric then for instance engages the joining end of the soldering tip and a force is effected which presses the soldering tip to the soldering device or, see in the following, to the heating means. The soldering tip and the heating means could also be designed in a manner that they match positively and secured against rotation and pressing both together is performed by turning the receiving sleeve by cooperation of inner cone and outer cone.

Furthermore it is advantageous when the receiving sleeve also forms part of the heating means of the soldering device. This may for instance be implemented in that a heating winding is directly arranged on an outer side of the receiving sleeve.

Furthermore, the receiving sleeve may have an insertion opening for a heating means and/or a temperature sensor at its end opposite the soldering tip.

Corresponding to the outer cone, the inner cone is also arranged eccentrically with respect to the following cylindrical receiving section. The eccentricities between the inner and the outer cone and the respective cylindrical section may have different sizes and/or alignments relative to the cylindrical section. For a simple manufacture of the fixing means it is advantageous, when the central axes of outer cone and inner cone have the same spacing to the central axes of cylindrical section and cylindrical receiving section. The central axes of outer cone and inner cone may be collinear.

The above described soldering tip may not only be formed for a so-called soldering iron but also as a nozzle of a hot-air soldering device, through which hot air is guided to the portion to be soldered or unsoldered.

In such a nozzle of a hot-air soldering device as a soldering tip, the nozzle may comprise at least two longitudinal ducts arranged coaxially for hot air or for a vacuum for taking off a component to be unsoldered, whereby the nozzle further has an improved structure. When using the new fixing device, it is ensured for the nozzle for instance, that the longitudinal ducts formed in the nozzle communicate in a sealed manner with corresponding longitudinal ducts in the soldering device connected.

An advantageous embodiment of the invention is not explained and described with reference to the drawings.

FIG. 1 is a side elevation view of a soldering tip 2 as part of a fixing device 1 according to the invention, which is cut in its lower half.

Figure 1:
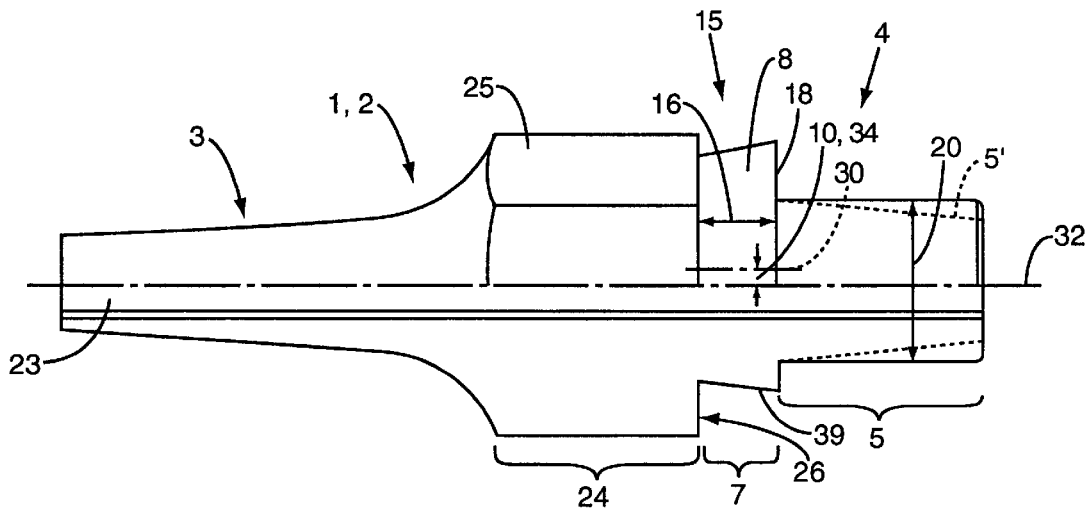
FIG. 1 is a partially cut side elevation view of a soldering tip as part of the fixing device according to the invention.

The soldering tip 2 comprises a working end 3 and, connected thereto, a head section 24, a conical section 7 and a cylindrical section 5.

The working end 3 expands in the direction towards the head section 24 in a manner curved towards the outside. The head section 24 is formed on its outer side with an outer hexagon 25. On its side opposite the working end 3, the head section 4 comprises an abutment face 26 extending radially inwardly in the direction towards a central axis 32 of the soldering tip. The conical section 7 is connected to this abutment face. This conical section is formed as an outer cone 8 or a conical collar 15, which tapers in a conical manner in the direction towards the working end 3.

The outer cone 8 has the shape of a truncated cone, wherein its central axis 30 i s arranged with respect to the central axis 32 of the remaining soldering tip at an offset 34 or at an eccentricity 10.

The truncated outer cone 8 comprises on its side opposite the head section 24 a rear side 18 extending radially inwardly towards the cylindrical section 5. This rear side encompasses the cylindrical section 5 basically as a concentrically formed ring. The cylindrical section 5 has an outer diameter 20, wherein a solder suction duct 23 penetrates this section as the remaining sections of the soldering tip 2 in a manner concentrically to the central axis 32.

The outer cone 8 or the conical collar 15 and the cylindrical section 5 form an insertion end 4 of the soldering tip 2.

Figure 2:
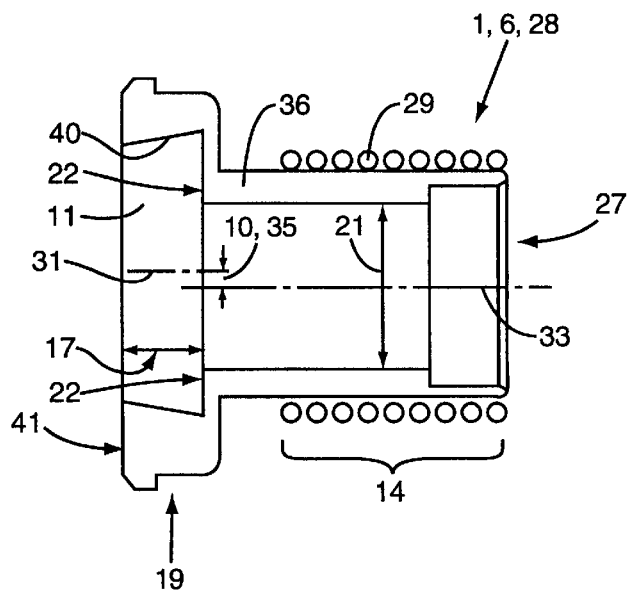
FIG. 2 is a lateral sectional view of a receiving sleeve as part of the fixing device according to the invention.

FIG. 1 furthermore shows in principle an embodiment of the fixing device according to the invention, in which the section 5' is formed conically tapering towards the receptacle 6, see FIG. 2. A receiving section 14 also tapering conically towards the soldering tip 2, see also FIG. 2, is not shown for the sake of clarity.

FIG. 2 is a lateral side elevation view of a receiving sleeve 28 formed as a receptacle 6 of the fixing means 1 according to the invention.

The receiving sleeve 28 comprises a cylindrical receiving section 14. This section is cylindrical, with a cylinder envelope 36 and an inner diameter 21. FIG. 2 shows an annular flange 19 arranged left at the cylindrical receiving section 14, said annular flange projecting radially over the cylinder envelope 36 towards the outside. An inner cone 11 is formed within the annular flange 19, said inner cone tapering conically in the direction away from the cylindrical receiving section 14. The inner cone 11 is arranged eccentrically with respect to the cylindrical receiving section 14, wherein a central axis 31 of the inner cone 11 is arranged at a spacing 35 towards a central axis 33 of the cylindrical section 14 or at an eccentricity 10. The inner cone 11 has a depth 17 which is substantially equal to a height 16 of the outer cone 8, see FIG. 1.

The inner cone 11 comprises an inner cone bottom 22 on its lower side facing the cylindrical receiving section 14, said inner cone bottom extending radially outwardly relative to the cylindrical receiving section 14.

On its end opposite the annular flange 19, the cylindrical receiving section 14 has a portion of enlarged diameter.

The inner cone and the interior of the cylindrical receiving section 14 are formed by an inner bore 27 of the receiving sleeve 28. A heating winding as part of a heating means 29 may be wound onto the cylinder envelope 36 of the cylindrical receiving section 14.

Figure 3:
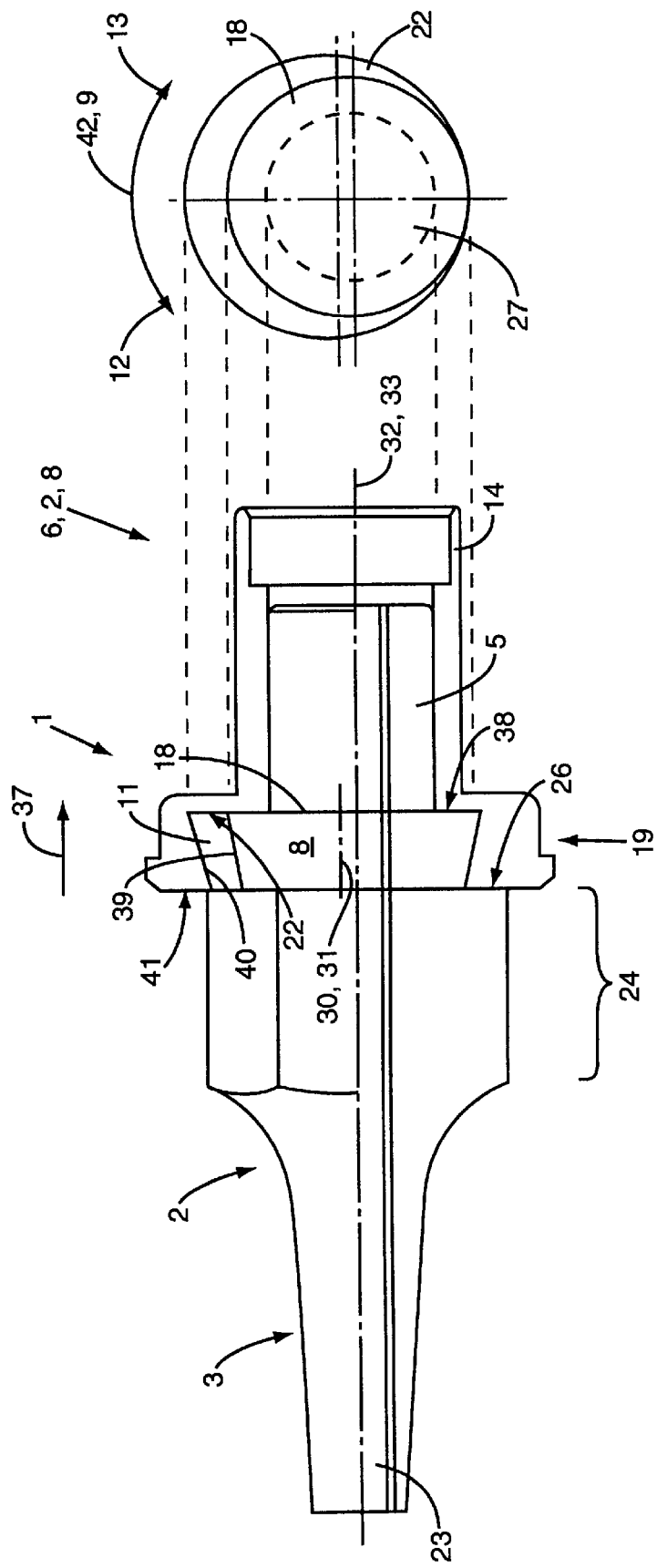
FIG. 3 shows the soldering tip and receiving sleeve according to FIG. 1 and 2 in fixing position.

FIG. 3 shows a fixing device 1 with a soldering tip 2 in fixing position 13. The same reference numerals characterize the same portions and are only partially mentioned.

In the fixing position 13—see in the right part of FIG. 3 the direction of rotation 42 for rotating the soldering tip 2 between the insertion position 12 and the fixing position 13—the outer cone 8 is arranged in the inner cone 11. The rear side 18 of the outer cone 8 abuts the inner cone bottom 22. Furthermore at least a section of an outer conical surface 39 abuts an inner conical surface 40. By these abutting surfaces, a heat transfer portion 38 between the receiving sleeve 28 and the soldering tip 2 is formed in particular in the area of rear side 18 and inner cone bottom 22.

The cylindrical section 5 of the insertion end 4, see FIG. 1 of the soldering tip 2 is fully inserted into the cylindrical receiving section 14 of the receiving sleeve 28. The cylindrical section 14 serves as a pivot bearing for the cylindrical section 5 when turning the soldering 2 from the insertion direction 12 into the fixing position 13 of the insertion end 4 or the outer cone 8.

Furthermore, the abutment face 26 of the head section 24 abuts an outer marginal face 41 of the annular flange 19 in fixing position 13.

FIG. 3 shows that the eccentricity of outer cone and inner cone with respect to the respective cylindrical section 5, 14 is equal, i.e. the spacing between the central axes 30, 31 and the central axes 32, 33 is equal.

In the right portion of FIG. 3, it is further shown that for instance the rear side 18 of the outer cone 8 abuts the inner cone bottom 22, wherein the respective abutment face is delimited towards the inside by the inner bore 27.

What is claimed is:

1. A fixing device (1) for fixing a soldering tip (2) at a soldering device, wherein the soldering tip (2) comprises a front working end (3) and a rear fixing end (4) opposite the front working end, and wherein the soldering device comprises a joining end (6) for fixing the fixing end (4), wherein a rotation-symmetrical section (5) is arranged at one of said joining and fixing ends (4, 6), characterized in that one end (4, 6) comprises a conical section (7), which is formed with an outer cone (8) arranged at least at certain portions in the circumferential direction, said outer cone being arranged eccentrically with respect to the rotation-symmetrical section (5), wherein the other of said joining and fixing ends (6, 4) is formed with an inner cone (11), in which the outer cone (8) is supported rotatable between an insertion position (12) and a fixing position (13).

2. A fixing device as claimed in claim 1, characterized in that the rotation-symmetrical section is substantially cylindrical.

3. A fixing device as claimed in claim 1 characterized in that the fixing end (4) comprises the rotation-symmetrical section (5) and the outer cone (8), wherein the outer cone (8) tapers conically towards the working end (3), and the joining end (6) is formed as a receptacle for inserting the fixing end (4), and is formed with the inner cone (11), which tapers conically towards the soldering tip (2).

4. A fixing device as claimed in claim 1, wherein the joining end (6) comprises a cylindrical receiving section (14) which is complementary to the rotation-symmetrical section (5) of the soldering tip (2), characterized in that the outer cone (8) and the inner cone (11) are arranged in the direction towards the working end (3) in front of the rotation-symmetrical section (5) of the fixing end (4) and the cylindrical receiving section (14) of the joining end (6).

5. A fixing device as claimed in claim 4, characterized in that the rotation-symmetrical section (5) tapers conically towards the fixing end, and the receiving section (14) is formed respectively, in particular complementary thereto.

6. A fixing device as claimed in claim 4, characterized in that the inner cone (11) is formed in an annular flange (19) which is arranged in front of the cylindrical receiving section (14) of the joining end (6) in the direction towards the soldering tip (2).

7. A fixing device as claimed in claim 4, characterized in that the rotation-symmetrical section (5) and the cylindrical receiving section (14) of the fixing end (4) and the joining end (6) have substantially the same outer and inner diameter (20, 21).

8. A fixing device as claimed in claim 4, characterized in that an inner cone bottom (22) extends radially towards the cylindrical receiving section (14).

9. A fixing device as claimed in claim 4, characterized in that the cylindrical receiving section (14) and the inner cone (11) of the joining end (6) are formed by an inner bore (27) in a receiving sleeve (28).

10. A fixing device as claimed in claim 1, characterized in that the outer cone (8) of the fixing end (4) is formed as a conical collar (15) extending in the circumferential direction (9).

11. A fixing device as claimed in claim 1, characterized in that the inner cone (11) and the outer cone (8) are inclined along their circumference in the direction towards the working end (3) of the soldering tip (2).

12. A fixing device as claimed in claim 11, characterized in that the inner cone (11) and the outer cone (8) are substantially formed as truncated cones.

13. A fixing device as claimed in claim 12, characterized in that a height (16) and a depth (17) of outer cone (8) and inner cone (11) are substantially equal.

14. A fixing device as claimed in claim 1, characterized in that a rear side (18) of the outer cone (8) radially projects from the rotation-symmetrical section (5) towards an outer edge.

15. A fixing device as claimed in claim 1, characterized in that the outer cone (8) and inner cone (11) in the fixing position (13) of the soldering tip (2) are in abutment adjacent to an outer cone rear end (18) and an inner cone bottom (22).

16. A fixing device as claimed in claim 1, characterized in that the soldering tip (2) is provided with a solder suction duct (23).

17. A fixing device as claimed in claim 1, characterized in that the soldering tip (2) comprises a head section (24) with an outer hexagon between the working end (3) and the fixing end (4), wherein the outer cone (8) extends up to a radially outwardly extending abutment face (26) of the head section (24).

18. A fixing device as claimed in claim 17, characterized in that an abutment face (26) of the head section (24) projects radially outwardly to a greater extent than a rear side (18) of the outer cone (8).

19. A fixing device as claimed in claim 1, characterized in that a receiving sleeve (28) is part of a heating means (29) of the soldering device.

20. A fixing device as claimed in claim 1, characterized in that central axes (30, 31) of outer cone (8) and inner cone (11) are arranged at equal spacing (34, 35) to central axes (32, 33) of rotation-symmetrical section (5) and cylindrical receiving section (14).

21. A fixing device as claimed in claim 1, characterized in that the soldering tip (2) is formed as a nozzle of a hot-air soldering device.

22. A fixing device as claimed in claim 1, characterized in that nozzle (2) comprises at least two coaxially arranged longitudinal ducts for hot air or for vacuum pressure for lifting a component to be unsoldered.

23. A soldering device comprising:

a soldering tip having a rotation symmetrical section and a conical collar, said conical collar being arranged eccentrically to a central axis;

a receiving sleeve having a cylindrical receiving section and an inner cone, said cylindrical receiving section being arranged eccentrically with respect to said inner cone; and said inner cone being sized to receive said conical collar and said cylindrical receiving section being sized to receive said rotation symmetrical section, said soldering tip being rotatable within said receiving sleeve between an insertion position in which said tip may move axially to and from said receiving sleeve, and a fixed position in which said conical collar mates with said inner cone to prevent axial movement of said tip relative to said receiving sleeve.

24. The device of claim 23, further including a heating element connected to said cylindrical receiving section, said soldering tip and said cylindrical receiving section abutting together in said fixed position to allow heat to transfer from said cylindrical receiving section to said soldering tip.

* * * * *